(12) United States Patent
Yasuda et al.

(10) Patent No.: US 11,097,461 B2
(45) Date of Patent: Aug. 24, 2021

(54) BATTERY PACKAGING MATERIAL, PRODUCTION METHOD THEREFOR, BATTERY, AND POLYESTER FILM

(71) Applicant: DAI NIPPON PRINTING CO., LTD., Tokyo (JP)

(72) Inventors: Daisuke Yasuda, Tokyo (JP); Rikiya Yamashita, Tokyo (JP); Takanori Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 315 days.

(21) Appl. No.: 16/306,265

(22) PCT Filed: May 31, 2017

(86) PCT No.: PCT/JP2017/020358
§ 371 (c)(1),
(2) Date: Nov. 30, 2018

(87) PCT Pub. No.: WO2017/209217
PCT Pub. Date: Dec. 7, 2017

(65) Prior Publication Data
US 2019/0143581 A1 May 16, 2019

(30) Foreign Application Priority Data
May 31, 2016 (JP) .............................. JP2016-109217

(51) Int. Cl.
*B29C 55/12* (2006.01)
*B32B 27/36* (2006.01)
(Continued)

(52) U.S. Cl.
CPC .............. *B29C 55/12* (2013.01); *B32B 27/36* (2013.01); *B65D 65/40* (2013.01); *H01M 50/10* (2021.01);
(Continued)

(58) Field of Classification Search
None
See application file for complete search history.

(56) References Cited

U.S. PATENT DOCUMENTS 5,139,727 A * 8/1992 Utsumi ................. B29C 55/065
264/210.7
2008/0286635 A1 11/2008 Seino et al.
(Continued)

FOREIGN PATENT DOCUMENTS

JP  2005-350615 A  12/2005
JP  2006-188049 A  7/2006
(Continued)

OTHER PUBLICATIONS

Dec. 19, 2019 European Search Report issued in European Patent Application No. 17806768.2.
(Continued)

*Primary Examiner* — Vivian Chen
(74) *Attorney, Agent, or Firm* — Oliff PLC

(57) ABSTRACT

A battery packaging material including a laminate that is provided with a barrier layer, a heat-fusible resin layer positioned on one surface side of the barrier layer, and a polyester film positioned on other surface side of barrier layer. This battery packaging material is configured from at least a laminate provided with a barrier layer, heat-fusible resin layer positioned on one surface side of barrier layer, and a polyester film positioned on other surface side of barrier layer. When infrared absorption spectrum on the polyester film's surface in 18 directions at intervals of 10° from 0°-180° is obtained using total reflection method of Fourier transform infrared spectroscopy, the ratio of the maximum value and the minimum value of the ratio ($Y_{1340}/Y_{1410}$) of the absorption peak intensity $Y_{1340}$ in 1340 cm$^{-1}$
(Continued)

and the absorption peak intensity $Y_{1410}$ in 1410 cm$^{-1}$ in the infrared absorption spectrum is in the range of 1.4-2.7.

8 Claims, 3 Drawing Sheets

(51) Int. Cl.

| | |
|---|---|
| B65D 65/40 | (2006.01) |
| H01M 50/10 | (2021.01) |
| H01M 50/124 | (2021.01) |
| H01M 50/183 | (2021.01) |
| B32B 37/24 | (2006.01) |
| B32B 7/00 | (2019.01) |
| B32B 7/04 | (2019.01) |
| H01M 50/131 | (2021.01) |
| H01M 50/121 | (2021.01) |
| H01M 50/129 | (2021.01) |
| H01M 50/126 | (2021.01) |
| H01M 50/105 | (2021.01) |
| H01M 50/133 | (2021.01) |
| B32B 15/09 | (2006.01) |
| B32B 7/12 | (2006.01) |

(52) U.S. Cl.
CPC ....... *H01M 50/124* (2021.01); *H01M 50/183* (2021.01); *B32B 7/00* (2013.01); *B32B 7/04* (2013.01); *B32B 2037/246* (2013.01); *B32B 2250/03* (2013.01); *B32B 2367/00* (2013.01); *B32B 2553/00* (2013.01); *B65D 2585/86* (2013.01); *H01M 50/105* (2021.01); *H01M 50/121* (2021.01); *H01M 50/126* (2021.01); *H01M 50/129* (2021.01); *H01M 50/131* (2021.01); *H01M 50/133* (2021.01); *Y10T 428/1334* (2015.01); *Y10T 428/1341* (2015.01); *Y10T 428/1352* (2015.01); *Y10T 428/1355* (2015.01); *Y10T 428/1359* (2015.01); *Y10T 428/1379* (2015.01); *Y10T 428/1383* (2015.01); *Y10T 428/2813* (2015.01); *Y10T 428/2817* (2015.01); *Y10T 428/2826* (2015.01); *Y10T 428/31681* (2015.04); *Y10T 428/31786* (2015.04)

(56) References Cited

U.S. PATENT DOCUMENTS

| | | | |
|---|---|---|---|
| 2010/0220074 A1* | 9/2010 | Irvin, Jr. | G06F 3/045 |
| | | | 345/174 |
| 2013/0011663 A1* | 1/2013 | Imai | B32B 23/06 |
| | | | 428/332 |
| 2014/0376091 A1* | 12/2014 | Jordan | B29D 11/00278 |
| | | | 359/567 |
| 2015/0014202 A1* | 1/2015 | Haruta | C08J 5/18 |
| | | | 206/459.5 |
| 2016/0090456 A1* | 3/2016 | Ishimaru | C08G 63/183 |
| | | | 428/131 |
| 2016/0137833 A1 | 5/2016 | Haruta et al. | |
| 2017/0263899 A1 | 9/2017 | Takahagi et al. | |
| 2018/0043607 A1* | 2/2018 | Haruta | B29C 63/0065 |
| 2018/0079877 A1* | 3/2018 | Ishimaru | C08J 5/18 |
| 2018/0319539 A1* | 11/2018 | Haruta | B65D 23/0821 |
| 2019/0077535 A1* | 3/2019 | Okuyama | B29C 49/46 |
| 2019/0270237 A1* | 9/2019 | Yasuda | H01M 2/0277 |

FOREIGN PATENT DOCUMENTS

| | | | |
|---|---|---|---|
| JP | 2008-287971 A | | 11/2008 |
| JP | 2014-069384 A | | 4/2014 |
| JP | 2014-226812 A | | 12/2014 |
| JP | 2015-217654 A | * | 12/2015 |
| JP | 2017-061145 A | | 3/2017 |
| WO | WO 2014/185442 A | * | 11/2014 |
| WO | 2014/199787 A1 | | 12/2014 |
| WO | WO 2014/199787 A | * | 12/2014 |
| WO | 2015/019885 A1 | | 2/2015 |
| WO | 2016/031758 A1 | | 3/2019 |

OTHER PUBLICATIONS

Jul. 4, 2017 International Search Report issued in International Patent Application No. PCT/JP2017/020358.
Aug. 9, 2019 Office Action issued in Chinese Patent Application. No. 201780033774.6.

* cited by examiner

BATTERY PACKAGING MATERIAL, PRODUCTION METHOD THEREFOR, BATTERY, AND POLYESTER FILM

TECHNICAL FIELD

The present invention relates to a battery packaging material, a method for producing the battery packaging material, a battery, and a polyester film.

BACKGROUND ART

Various types of batteries have been developed heretofore, and in every battery, a packaging material is an essential member for encapsulating a battery element such as an electrode and an electrolyte. Metallic packaging materials have often been used for battery packaging heretofore.

On the other hand, in recent years, batteries are being required to be diversified in shape and to be reduced in thickness and weight along with improvement in performance of, for example, electric cars, hybrid electric cars, personal computers, cameras, and mobile phones. Metallic battery packaging materials that have often been used heretofore, however, have trouble in keeping up with diversification in shape and also have a disadvantage of limiting the reduction in weight.

Thus, in recent years, there has been proposed a film-shaped laminate including a base material, a barrier layer, and a heat-sealable resin layer laminated sequentially, as a battery packaging material that is easily processed into diverse shapes and is capable of achieving the reduction in thickness and weight (see, for example, Patent Document 1). In such a battery packaging material, generally, a concave portion is formed by cold molding, a battery element such as an electrode and an electrolytic solution is disposed in a space formed by the concave portion, and portions of the heat-sealable resin layer are heat-sealed to each other to give a battery with the battery element stored in the battery packaging material.

PRIOR ART DOCUMENT

Patent Document

Patent Document 1: Japanese Patent Laid-open Publication No. 2008-287971

SUMMARY OF THE INVENTION

Problems to be Solved by the Invention

In recent years, a battery packaging material is being required to be furthermore reduced in film thickness, along with a requirement of reducing the size and the thickness of batteries.

However, when the thickness of each layer in the battery packaging material decreases, a peripheral edge of a concave portion formed on the battery packaging material is curled (curved), so that storage of a battery element and heat sealing of a heat-sealable resin layer are sometimes hindered, leading to deterioration of production efficiency of batteries. Particularly, a battery packaging material to be used in a large secondary battery such as a secondary battery for use in cars has a problem that since the battery packaging material has a large size, the impact of curling on productivity of batteries is very large.

Further, as regards a battery having its outer surface (surface of a base material) formed of, for example, a nylon film, attachment of an electrolytic solution to the surface of the battery in a step of producing the battery affects (whitens) the outer surface of the battery to make the battery a defect. Therefore, in order to improve chemical resistance and electrolytic solution resistance of the outer surface of a battery, a stretched polyester film is sometimes used as a base material. The present inventors, however, have found that a battery packaging material including a laminated stretched polyester film particularly easily generates the curling. Further, the battery packaging material with a small thickness has a problem of easily decreasing its moldability. In particular, the stretched polyester film has a problem of being harder than a polyamide film and thus being inferior in moldability.

Under such circumstances, a main object of the present invention is to provide a technique of improving the moldability and minimizing curling after molding of a battery packaging material that includes a laminate having a barrier layer, a heat-sealable resin layer situated on one surface side of the barrier layer, and a polyester film situated on the other surface side of the barrier layer.

Means for Solving the Problems

The present inventors have extensively conducted studies to solve the above-mentioned problems. As a result, the present inventors have found that as regards a battery packaging material that includes a laminate having at least a barrier layer, a heat-sealable resin layer situated on one surface side of the barrier layer, and a polyester film situated on the other surface side of the barrier layer, the battery packaging material is excellent in moldability and effectively minimizes curling after molding when the polyester film has a ratio in a range of 1.4 or more and 2.7 or less between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ and an absorption peak intensity $Y_{1410}$ at 1410 cm$^{1}$ ($Y_{1340}/Y_{1410}$) in infrared absorption spectra acquired for 18 directions at intervals of 10° from 00 to 1800 on a surface of the polyester film according to attenuated total reflection of Fourier transform infrared spectroscopy. The present invention has been completed by further conducting repetitive studies based on these findings.

That is, the present invention provides an invention with the aspects described below.

Item 1. A battery packaging material including a laminate that has at least a barrier layer, a heat-sealable resin layer situated on one surface side of the barrier layer, and a polyester film situated on the other surface side of the barrier layer, the polyester film having a ratio in a range of 1.4 or more and 2.7 or less between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ and an absorption peak intensity $Y_{1410}$ at 1410 cm$^{-1}$ ($Y_{1340}/Y_{1410}$) in infrared absorption spectra acquired for 18 directions at intervals of 10° from 0° to 180° on a surface of the polyester film according to attenuated total reflection of Fourier transform infrared spectroscopy.

Item 2. The battery packaging material according to item 1, wherein a ratio of thickness of the heat-sealable resin layer to thickness of the polyester film is less than 3.

Item 3. The battery packaging material according to item 1 or 2, wherein the heat-sealable resin layer has a thickness of 100 µm or less.

Item 4. The battery packaging material according to any one of items 1 to 3, wherein the polyester film has a birefringence index of 0.016 or more.

Item 5. A battery including: a battery element that has at least a positive electrode, a negative electrode, and an electrolyte; and packaging that is formed of the battery packaging material according to any one of items 1 to 4 and stores the battery element therein.

Item 6. A method for producing a battery packaging material, the method including:

a step of obtaining a laminate by laminating at least a polyester film, a barrier layer, and a heat-sealable resin layer in this order, and using, as the polyester film, a polyester film having a ratio in a range of 1.4 or more and 2.7 or less between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ and an absorption peak intensity $Y_{1410}$ at 1410 cm$^{-1}$ ($Y_{1340}/Y_{1410}$) in infrared absorption spectra acquired for 18 directions at intervals of 10° from 0° to 180° on a surface of the polyester film according to attenuated total reflection of Fourier transform infrared spectroscopy.

Item 7. A polyester film used in a battery packaging material, the polyester film having a ratio in a range of 1.4 or more and 2.7 or less between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ and an absorption peak intensity $Y_{1410}$ at 1410 cm$^{-1}$ ($Y_{1340}/Y_{1410}$) in infrared absorption spectra acquired for 18 directions at intervals of 10° from 00 to 1800 on a surface of the polyester film according to attenuated total reflection of Fourier transform infrared spectroscopy.

Item 8. Use of a polyester film in a battery packaging material, the polyester film having a ratio in a range of 1.4 or more and 2.7 or less between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ and an absorption peak intensity $Y_{1410}$ at 1410 cm$^{-1}$ ($Y_{1340}/Y_{1410}$) in infrared absorption spectra acquired for 18 directions at intervals of 10° from 00 to 1800 on a surface of the polyester film according to attenuated total reflection of Fourier transform infrared spectroscopy.

Advantages of the Invention

According to the present invention, it is possible to provide a battery packaging material that includes a laminate having a barrier layer, a heat-sealable resin layer situated on one surface side of the barrier layer, and a polyester film situated on the other surface side of the barrier layer and that is excellent in moldability and effectively minimizes curling after molding.

EMBODIMENTS OF THE INVENTION

A battery packaging material according to the present invention is characterized by including a laminate that has at least a barrier layer, a heat-sealable resin layer situated on one surface side of the barrier layer, and a polyester film situated on the other surface side of the barrier layer, the polyester film having a ratio in a range of 1.4 or more and 2.7 or less between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ (CH$_2$ wagging vibration) and an absorption peak intensity $Y_{1410}$ at 1410 cm$^{-1}$ (C=C stretching vibration) ($Y_{1340}/Y_{1410}$) in infrared absorption spectra acquired for 18 directions at intervals of 10° from 0° to 180° on a surface of the polyester film according to attenuated total reflection of Fourier transform infrared spectroscopy. Hereinafter, the battery packaging material according to the present invention is described in detail.

In the present specification, the expression of a numerical range "(from) a value to a value" represents the value on the left side or more and the value on the right side or less. For example, the expression of a numerical range "(from) X to Y" means X or more and Y or less.

1. Laminated Structure of Battery Packaging Material

Figure 1:
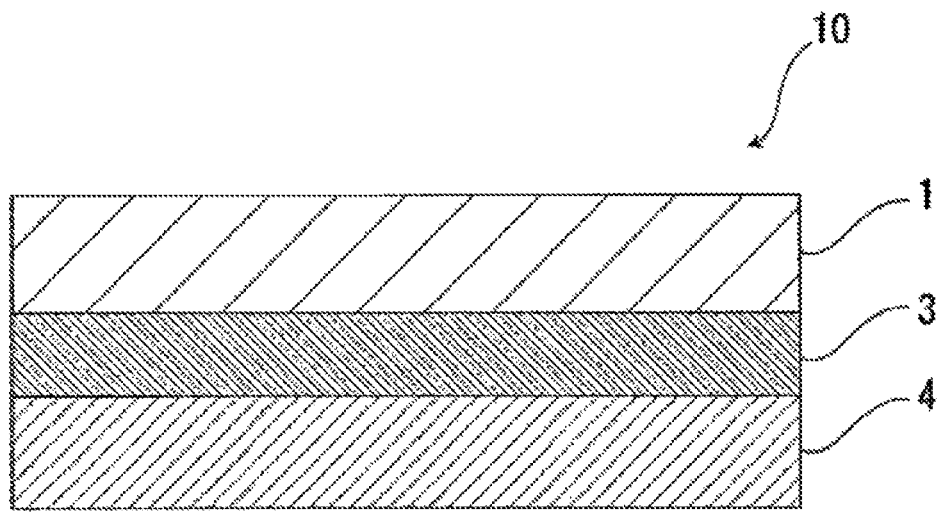
FIG. 1 is a view showing one exemplified cross-sectional structure of a battery packaging material according to the present invention.

A battery packaging material 10 according to the present invention includes, as shown in FIG. 1, a laminate having, for example, a polyester film 1, a barrier layer 3, and a heat-sealable resin layer 4 in this order. In the battery packaging material according to the present invention, the polyester film 1 is disposed on a battery packaging material's outermost-layer side and the heat-sealable resin layer 4 is an innermost layer. That is, portions of the heat-sealable resin layer 4 that are situated on a periphery of a battery element are heat-sealed to each other to hermetically seal the battery element in the heat-sealable resin layer during assembly of a battery, so that the battery element is encapsulated.

Figure 2:
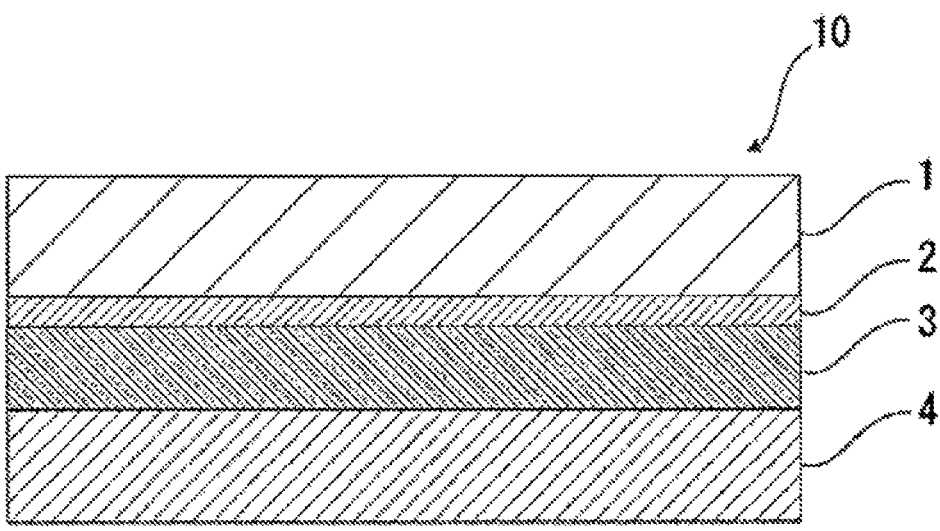
FIG. 2 is a view showing one exemplified cross-sectional structure of the battery packaging material according to the present invention.
Figure 3:
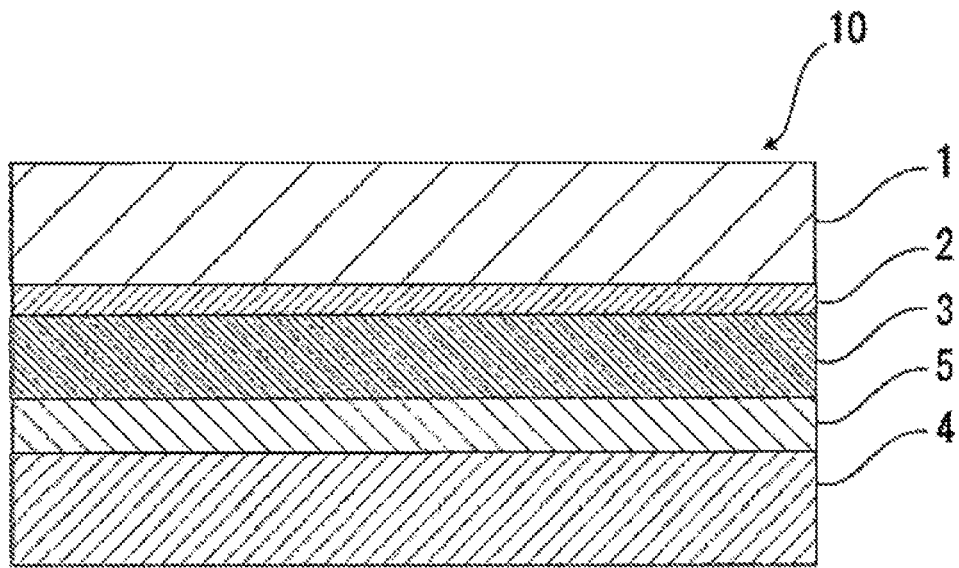
FIG. 3 is a view showing one exemplified cross-sectional structure of the battery packaging material according to the present invention.
Figure 4:
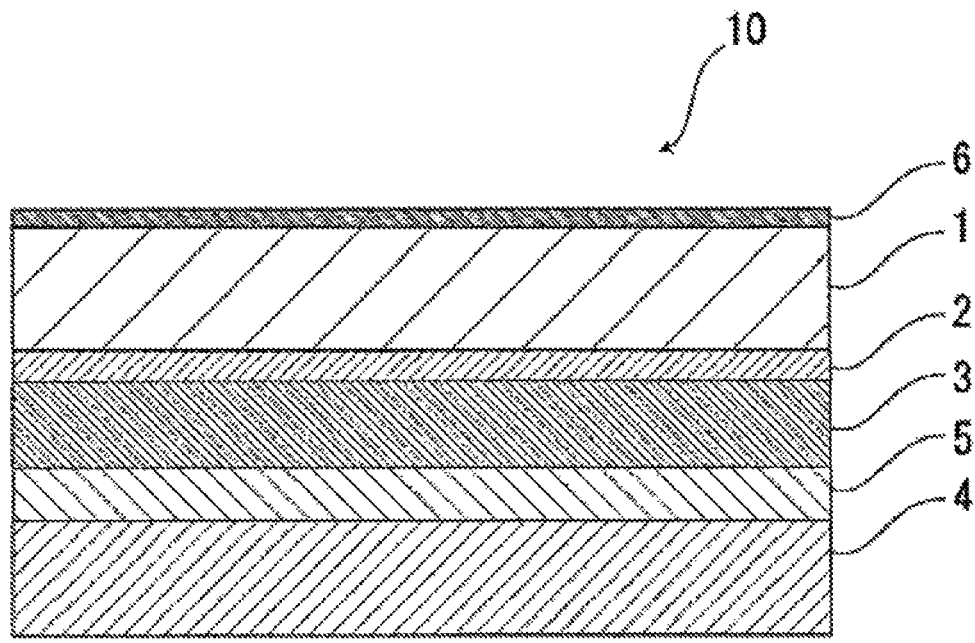
FIG. 4 is a view showing one exemplified cross-sectional structure of the battery packaging material according to the present invention.

As shown in FIG. 2, the battery packaging material according to the present invention may include, for example, an adhesive agent layer 2 between the polyester film 1 and the barrier layer 3 as necessary for the purpose of increasing the adhesiveness between these layers. An adhesive layer 5 may be provided between the barrier layer 3 and the heat-sealable resin layer 4 as necessary for the purpose of increasing the adhesiveness between these layers. Further, as shown in FIG. 4, for example, a surface coating layer 6 may be provided on an exterior of the polyester film 1 (opposite to the heat-sealable resin layer 4) as necessary.

The total thickness of the laminate that forms the battery packaging material according to the present invention is not particularly limited but is, for example, preferably about 160 µm or less, more preferably about 35 to 155 µm, further preferably about 45 to 120 µm, from a viewpoint of reducing the total thickness of the laminate to the minimum possible, allowing the battery packaging material to exhibit high moldability, and further effectively minimizing curling after molding. Even when the laminate that forms the battery packaging material according to the present invention has a thickness of as small as, for example, 160 µm or less, the present invention allows the battery packaging material to have excellent moldability and is capable of effectively minimizing curling after molding.

2. Layers Forming Battery Packaging Material
[Polyester Film 1]

In the battery packaging material according to the present invention, the polyester film 1 is a layer that is situated on a battery packaging material's outermost-layer side and functions as a base material.

In the battery packaging material according to the present invention, the polyester film has a ratio in a range of 1.4 to 2.7 between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ (CH$_2$ wagging vibration) and an absorption peak intensity $Y_{1410}$ at 1410 cm$^{-1}$ (C=C stretching vibration) ($Y_{1340}/Y_{1410}$) in infrared absorption spectra acquired for 18 directions at intervals of 10° from 0° to 180° on a surface of the polyester film according to attenuated total reflection of Fourier transform infrared spectroscopy. With the polyester film having a degree of surface orientation ($Y_{max}/Y_{min}$) in the range of 1.4 to 2.7, the battery packaging material according to the present invention is excellent in moldability and further effectively minimizes curling after molding. This mechanism is considered to be as follows. That is, since the polyester film has a degree of surface orientation ($Y_{max}/Y_{min}$) in the range of 1.4 to 2.7, polyester molecules that form the polyester film are considered to have high crystal orientation to suppress contraction of the polyester film during molding, resulting in allowing the battery packaging material to exhibit excellent moldability and effectively minimize curling after molding.

Specific conditions for measuring the infrared absorption spectra are as follows. The measurement of the infrared absorption spectra on the surface of the polyester film can be performed for a polyester film laminated in the battery packaging material as long as the surface of the polyester film is exposed. When, for example, the surface coating layer 6 described later is laminated on the surface of the polyester film 1, the surface coating layer 6 is removed to expose the surface of the polyester film and then the measurement can be performed. The following measurement of the infrared absorption spectra for the polyester film of the present invention is performed for a polyester film as a single layer under the measurement conditions described below.

(Conditions for Measuring Infrared Absorption Spectra)

The measurement is performed with a Fourier transform infrared spectrophotometer under the following conditions according to single reflection ATR.
Wavenumber resolution: 8 cm-1
IRE: Ge
Angle of incidence: 30°
Polarizer: wire grid, S polarization
Baseline: average value of intensity in a wavenumber range of 1800 cm-1 to 2000 cm-1
Absorption peak intensity $Y_{1340}$: value obtained by deducting value of baseline from maximum value of peak intensity in wavenumber range of 1335 cm-1 to 1342 cm-1
Absorption peak intensity $Y_{1410}$: value obtained by deducting value of baseline from maximum value of peak intensity in wavenumber range of 1400 cm-1 to 1410 cm-1

Acquisition of the infrared absorption spectra for 18 directions was performed by horizontally placing a polyester film as a sample on a sample holder and rotating the sample together with a Ge crystal placed on the sample by 10°. The angel of incidence is an angle between a vertical line (normal) and incident light.

The degree of surface orientation ($Y_{max}/Y_{min}$) is not particularly limited as long as it is in the range of 1.4 to 2.7. The degree of surface orientation, however, is, for example, preferably about 1.6 or more as a lower limit and is, for example, preferably about 2.4 or less as an upper limit, from a viewpoint of improving the moldability as well as allowing the battery packaging material to have excellent moldability and minimizing curling after molding. The degree of surface orientation ($Y_{max}/Y_{min}$) preferably ranges from about 1.4 to about 2.4, from about 1.6 to about 2.7, from about 1.6 to about 2.4, for example.

The polyester film having such a degree of surface orientation: $Y_{max}/Y_{min}$ can be produced by appropriately adjusting, for example, a stretching method, a stretching ratio, stretching speed, cooling temperature, and heat setting temperature during production of the polyester film.

In the battery packaging material according to the present invention, the polyester film preferably has a birefringence index of 0.016 or more. That is, the birefringence index (nx-ny) is preferably 0.016 or more that is calculated from measured refractive indexes, one of which is a refractive index (nx) along a slow axis having a large refractive index and the other of which is a refractive index (ny) along a fast axis orthogonal to the slow axis in measurement of the refractive indexes for the polyester film. The polyester film having a birefringence index of 0.016 or more allows the battery packaging material to exhibit more excellent moldability and furthermore effectively minimize curling after molding. This mechanism is considered to be as follows. That is, since the polyester film has a birefringence index of 0.016 or more, polyester molecules that form the polyester film are considered to have high crystal orientation to suppress contraction of the polyester film during molding, resulting in allowing the battery packaging material to exhibit more excellent moldability and furthermore effectively minimize curling after molding.

Specific conditions for measuring the birefringence index are as follows. The measurement of the birefringence index for the polyester film is performed for a polyester film used in the battery packaging material.

(Conditions for Measuring Birefringence Index)

The birefringence index of the polyester film can be measured using a phase difference measuring apparatus. The measurement wavelength is set to 550 nm and the angle of incidence is set to 10 degrees. The thickness of the polyester film used for calculation of the birefringence index is measured using a micrometer. An average refractive index of the polyester film used for calculation of the birefringence index is set to an assumed value of 1.6200.

The birefringence index is, for example, preferably about 0.019 or more as a lower limit and is, for example, preferably about 0.056 or less, more preferably about 0.050 or less, further preferably about 0.042 or less, further preferably about 0.026 or less, particularly preferably about 0.022 or less as an upper limit, from a viewpoint of furthermore improving the moldability as well as minimizing curling after molding. The birefringence index preferably ranges from about 0.016 to about 0.056, from about 0.016 to about 0.050, from about 0.016 to about 0.042, from about 0.016 to about 0.026, from about 0.016 to about 0.022, from about 0.019 to about 0.056, from about 0.019 to about 0.050, from about 0.019 to about 0.042, from about 0.019 to about 0.026, from about 0.019 to about 0.022, for example.

The refractive index (nx) along the slow axis of the polyester film is preferably about 1.68 to about 1.70. The refractive index (ny) along the fast axis of the polyester film is preferably about 1.64 to about 1.68.

The polyester film having such a birefringence index can be produced, as in the case of the polyester film having the degree of surface orientation: $Y_{max}/Y_{min}$ described above, by appropriately adjusting, for example, the stretching method, the stretching ratio, the stretching speed, the cooling temperature, and the heat setting temperature during production of the polyester film.

The polyester film is preferably a stretched polyester film, more preferably a biaxially stretched polyester film. The stretched polyester film is a polyester film stretched in a process of producing the polyester film.

Specific examples of polyester that forms the polyester film include polyethylene terephthalate, polybutylene terephthalate, polyethylene naphthalate, polybutylene naphthalate, polyethylene isophthalate, copolyester with ethylene terephthalate as a main repeating unit, and copolyester with butylene terephthalate as a main repeating unit. Specific examples of the copolyester with ethylene terephthalate as a main repeating unit include copolymer polyester obtained by polymerizing ethylene terephthalate as a main repeating unit with ethylene isophthalate (abbreviated as polyethylene (terephthalate/isophthalate) and the same applies hereinafter), polyethylene (terephthalate/isophthalate), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). Specific examples of the copolyester with butylene terephthalate as a main repeating unit include copolymer polyester obtained by polymerizing butylene terephthalate as a main repeating unit with butylene isophthalate (abbreviated as polybutylene(terephthalate/isophthalate) and the same applies hereinafter), polybutylene (terephthalate/adipate), polybutylene (terephthalate/sebacate), polybutylene (terephthalate/decane dicarboxylate), and polybutylene naphthalate. These types of polyester may be used alone or in combination of two or more thereof.

The thickness of the polyester film 1 is not particularly limited but is, for example, preferably 50 μm or less from a viewpoint of improving the moldability and effectively minimizing curling after molding. The thickness of the polyester film 1 is, for example, preferably about 4 to 30 μm, more preferably about 16 to 25 μm, from a viewpoint of furthermore increasing the moldability as well as minimizing curling. When the polyester film 1 has a multilayer structure as described later, the thickness of one polyester film layer situated on the battery packaging material's outermost-layer side is, for example, preferably about 4 to 16 μm, more preferably about 9 to 12 μm.

The polyester film 1 may have a single layer or multiple layers (multilayer structure). When the polyester film 1 has multiple layers, at least one polyester film layer situated on the battery packaging material's outermost-layer side (opposite to the barrier layer 3) may satisfy the range of the degree of surface orientation: $Y_{max}/Y_{min}$ described above.

In order to improve pinhole resistance and insulation quality when the battery packaging material is formed into packaging of a battery, it is also possible to form the base material by laminating, in addition to the polyester film, at least one of a different material resin film or coating (formation of a multilayer structure) on the one surface side of the barrier layer 3. Examples of another resin film used for the base material include a resin film formed of, for example, a polyamide, an epoxy resin, an acrylic resin, fluororesin, polyurethane, a silicone resin, a phenolic resin, a polyether imide, a polyimide, or mixtures or copolymerized products thereof. Specific examples of the structure including the polyester film 1 and the different material resin film formed into lamination include a multilayer structure including the polyester film and a polyamide film laminated on top of another.

Specific examples of a polyamide that forms the polyamide film include aliphatic polyamides such as nylon 6, nylon 66, nylon 610, nylon 12, nylon 46, and a copolymer of nylon 6 with nylon 6,6; aromatic-containing polyamides such as a hexamethylenediamine-isophthalic acid-terephthalic acid copolymerized polyamide (e.g., nylon 6I, nylon 6T, nylon 6IT, and nylon 6I6T (I represents isophthalic acid and T represents terephthalic acid) having a structural unit derived from terephthalic acid and/or isophthalic acid) and polymethaxylylene adipamide (MXD6); alicyclic polyamides such as polyaminomethyl cyclohexyl adipamide (PACM 6); a polyamide obtained by copolymerizing a lactam component with an isocyanate component such as 4,4'-diphenylmethane-diisocyanate, and a polyester amide copolymer and a polyether ester amide copolymer as a copolymer of a copolymerized polyamide with polyester or polyalkylene ether glycol; and copolymers thereof. These polyamides may be used alone or in combination of two or more thereof. The polyamide film is excellent in stretchability and capable of preventing generation of whitening caused by resin breakage during molding and is thus suitably used as the resin film used together with the polyester film 1 for the base material.

As specific examples of the cases in which the base material is the polyester film 1 having a multilayer structure and in which the base material includes the resin film, preferred are a laminate including a polyester film and a nylon film, and a laminate including a plurality of polyester films laminated on top of another, more preferred are a laminate including a stretched polyester film and a stretched nylon film, and a laminate including a plurality of stretched polyester films laminated on top of another. For example, when having a two-layer structure, the base material is preferably configured to include the polyester film and a polyamide film laminated on top of another or configured to include the polyester film and the polyester film laminated on top of another, and the base material is more preferably configured to include polyethylene terephthalate and nylon laminated on top of another or configured to include polyethylene terephthalate and polyethylene terephthalate laminated on top of another. The polyester film is less likely to be discolored even when, for example, an electrolytic solution is attached to a surface thereof, so that the base material can be formed into a laminate including a nylon film and the polyester film in this order from a base material's barrier-layer 3 side to be configured to have excellent electrolytic solution resistance. For example, 3 to 25 μm is preferable thickness of the polyester film not situated as the outermost layer or the resin film other than the polyester film.

When the base material is formed as the polyester film 1 having a multilayer structure or when the base material is configured to include the resin film, the polyester film 1 or the resin film may be bonded to another film with an adhesive agent interposed therebetween, or the polyester film 1 or the resin film may be directly laminated on another film without an adhesive agent interposed therebetween. Examples of a method for bonding the films without an adhesive agent interposed therebetween include methods of bonding the films in a heat-melted state, such as a coextrusion method, a sandwich lamination method, and a thermal lamination method. When the films are bonded with an adhesive agent interposed therebetween, the adhesive agent to be used may be a two-liquid curable adhesive agent or a one-liquid curable adhesive agent. An adhesive mechanism of the adhesive agent is not particularly limited and may be any one of a chemical reaction type, a solvent volatilization type, a heat melting type, a heat pressing type, an electron beam curing type, an ultraviolet curing type, and the like. Specific examples of the adhesive agent include the same adhesive agents as exemplified for the adhesive agent layer 2. The thickness of the adhesive agent can also be set as in the adhesive agent layer 2.

In the present invention, a lubricant is preferably attached to a surface of the battery packaging material from a viewpoint of increasing the moldability of the battery packaging material. The lubricant may be contained in the polyester film 1 or the surface coating layer 6 or may exist on a surface of the battery packaging material. The lubricant existing on a front surface of the battery packaging material may be one oozed out from a lubricant contained in a resin that forms the polyester film 1 or the surface coating layer 6, or one applied to a surface of the battery packaging material. The lubricant is not particularly limited but is preferably an amide-based lubricant. Specific examples of the lubricant include a saturated fatty acid amide, an unsaturated fatty acid amide, a substituted amide, a methylol amide, a saturated fatty acid bis-amide, and an unsaturated fatty acid bis-amide. Specific examples of the saturated fatty acid amide include lauric acid amide, palmitic acid amide, stearic acid amide, behenic acid amide, and hydroxystearic acid amide. Specific examples of the unsaturated fatty acid amide include oleic acid amide and erucic acid amide. Specific examples of the substituted amide include N-oleylpalmitic acid amide, N-stearylstearic acid amide, N-stearyloleic acid amide, N-oleylstearic acid amide, and N-stearylerucic acid amide. Specific examples of the methylol amide include methylolstearic acid amide. Specific examples of the saturated fatty acid bis-amide include methylene-bis-stearic acid amide, ethylene-bis-capric acid amide, ethylene-bis-lauric acid amide, ethylene-bis-stearic acid amide, ethylene-bis-hydroxystearic acid amide, ethylene-bis-behenic acid amide, hexamethylene-bis-stearic acid amide, hexamethylene-bis-behenic acid amide, hexamethylene-hydroxystearic acid amide, N,N'-distearyladipic acid amide, and N,N'-distearylsebacic acid amide. Specific examples of the unsaturated fatty acid bis-amide include ethylene-bis-oleic acid amide, ethylene-bis-erucic acid amide, hexamethylene-bis-oleic acid amide, N,N'-dioleyladipic acid amide, and N,N'-dioleylsebacic acid amide. Specific examples of the fatty acid ester amide include stearamide ethyl stearate. Specific examples of the aromatic bis-amide include m-xylylene-bis-stearic acid amide, m-xylylene-bis-hydroxystearic acid amide, and N,N'-distearylisophthalic acid amide. The lubricant may be used alone or in combination of two or more thereof.

When the lubricant exists on a surface of the polyester film 1, the abundance of the lubricant is not particularly limited but is, for example, preferably about 3 mg/m$^2$ or more, more preferably about 4 to 15 mg/m$^2$, further preferably about 5 to 14 mg/m$^2$ in an environment at a temperature of 24° C. and a relative humidity of 60%.

The total thickness of the polyester film 1 and the other resin film (total thickness of the base material) is not particularly limited but is, for example, preferably about 50 μm or less from a viewpoint of increasing the moldability and effectively minimizing curling after molding. The thickness of the polyester film 1 is, for example, preferably about 4 to 30 μm, more preferably about 16 to 25 μm, from a viewpoint of furthermore increasing the moldability as well as minimizing curling.

[Adhesive Agent Layer 2]

In the battery packaging material according to the present invention, the adhesive agent layer 2 is a layer provided between the polyester film 1 or the resin film and the barrier layer 3 as necessary, for strongly bonding these layers to each other.

The adhesive agent layer 2 is formed of an adhesive agent capable of bonding the polyester film 1 or the resin film to the barrier layer 3. The adhesive agent used for forming the adhesive agent layer 2 may be a two-liquid curable adhesive agent or a one-liquid curable adhesive agent. Further, the adhesive agent used for forming the adhesive agent layer 2 is not particularly limited and may be any one of a chemical reaction type, a solvent volatilization type, a heat melting type, a heat pressing type, and the like.

Specific examples of the adhesive component that can be used for forming the adhesive agent layer 2 include polyester-based resins such as polyethylene terephthalate, polybutylene terephthalate, polyethylene naphthalate, polybutylene naphthalate, polyethylene isophthalate, and copolyester; a polyether-based adhesive agent; a polyurethane-based adhesive agent; an epoxy-based resin; a phenol-based resin; polyamide-based resins such as nylon 6, nylon 66, nylon 12, and a copolyamide; polyolefin-based resins such as a polyolefin, a carboxylic acid-modified polyolefin, and a metal-modified polyolefin, and a polyvinyl acetate-based resin; a cellulose-based adhesive agent; a (meth) acrylic-based resin; a polyimide-based resin; polycarbonate; amino resins such as a urea resin and a melamine resin; rubber such as chloroprene rubber, nitrile rubber, and styrene-butadiene rubber; and a silicone-based resin. These adhesive components may be used alone or in combination of two or more thereof. Among these adhesive components, a polyurethane-based adhesive agent is preferred, for example. These resins to be an adhesive component can be used in combination with an appropriate curing agent to increase the adhesive strength. The curing agent is appropriately selected from, for example, a polyisocyanate, a polyfunctional epoxy resin, an oxazoline group-containing polymer, a polyamine resin, and an acid anhydride according to a functional group of the adhesive component. Preferable examples of these adhesive component and curing agent include a polyurethane-based adhesive agent containing various polyols (the above-mentioned adhesive components having a hydroxy group) and a polyisocyanate. Further preferable examples include a two-liquid curable polyurethane adhesive agent containing, as a main agent, a polyol such as polyester polyol, polyether polyol, or acrylic polyol and containing, as the curing agent, an aromatic or aliphatic polyisocyanate.

The thickness of the adhesive agent layer 2 is not particularly limited as long as it exhibits a function as an adhesive layer. The thickness of the adhesive agent layer 2 is, for example, about 1 to 10 μm, preferably about 2 to 5 μm.

[Barrier Layer 3]

In the battery packaging material, the barrier layer 3 is a layer that has a function of preventing ingress of, for example, water vapor, oxygen, and light into a battery, in addition to improving the strength of the battery packaging material. The barrier layer 3 is preferably a metal layer, i.e., a layer formed of metal. Specific examples of the metal that forms the barrier layer 3 include aluminum, stainless steel, and titanium. Aluminum is preferred, for example. The barrier layer 3 can be formed of, for example, a metal foil, a metal deposition film, an inorganic oxide deposition film, a carbon-containing inorganic oxide deposition film, or a film provided with these deposition films. The barrier layer 3 is preferably formed of a metal foil, further preferably formed of an aluminum alloy foil. The barrier layer 3 is more preferably formed of a soft aluminum alloy foil such as annealed aluminum (JIS H4160: 1994 A8021H-O, JIS H4160: 1994 A8079H-O, JIS H4000: 2014 A8021P-O, JIS H4000: 2014 A8079P-O), from a viewpoint of preventing generation of wrinkles and pinholes on the barrier layer 3 during production of the battery packaging material.

The thickness of the barrier layer 3 is not particularly limited as long as it exhibits a barrier function against, for example, water vapor. The thickness of the barrier layer 3 is, for example, preferably about 100 μm or less, more preferably about 10 to 100 μm, further preferably about 10 to 80 μm, from a viewpoint of reducing the thickness of the battery packaging material.

At least one surface, preferably both surfaces of the barrier layer 3 are preferably subjected to a chemical conversion treatment for, for example, stabilizing the adhesion and preventing dissolution and corrosion. Here, the chemical conversion treatment is a treatment for forming an acid resistance film on a surface of the barrier layer. In the present invention, the barrier layer 3 may include the acid resistance film on one surface or both surfaces thereof or may include no acid resistance film. Examples of the chemical conversion treatment include a chromate treatment using a chromium compound such as chromium nitrate, chromium fluoride, chromium sulfate, chromium acetate, chromium oxalate, chromium biphosphate, acetylacetate chromate, chromium chloride, or chromium potassium sulfate; a phosphoric acid treatment using a phosphoric acid compound such as sodium phosphate, potassium phosphate, ammonium phosphate, or polyphosphoric acid; and a chromate treatment using an aminated phenolic polymer having a repeating unit(s) represented by the following general formulae (1) to (4). In the aminated phenolic polymer, the repeating units represented by the general formulae (1) to (4) may be contained alone or in any combination of two or more thereof.

[Chemical Formula 1]

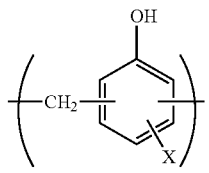

(1)

[Chemical Formula 2]

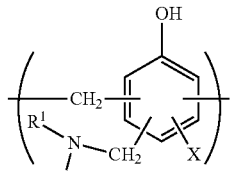

(2)

[Chemical Formula 3]

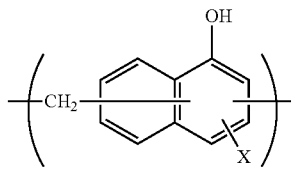

(3)

[Chemical Formula 4]

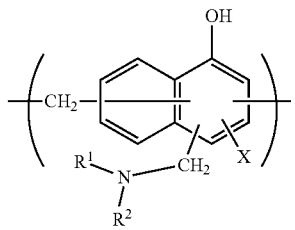

(4)

In the general formulae (1) to (4), X represents a hydrogen atom, a hydroxyl group, an alkyl group, a hydroxyalkyl group, an allyl group, or a benzyl group. $R^1$ and $R^2$ are identical or different, and each represent a hydroxyl group, an alkyl group, or a hydroxyalkyl group. In the general formulae (1) to (4), examples of the alkyl group represented by X, $R^1$ and $R^2$ include a linear or branched alkyl group with 1 to 4 carbon atoms, such as a methyl group, an ethyl group, a n-propyl group, an isopropyl group, a n-butyl group, an isobutyl group, and a tert-butyl group. Examples of the hydroxyalkyl group represented by X, $R^1$, and $R^2$ include a linear or branched alkyl group that is substituted with one hydroxy group and has 1 to 4 carbon atoms, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulae (1) to (4), the alkyl groups and the hydroxyalkyl groups represented by X, $R^1$, and $R^2$ may be identical or different. In the general formulae (1) to (4), X is preferably a hydrogen atom, a hydroxyl group, or a hydroxyalkyl group. The number average molecular weight of the aminated phenolic polymer having a repeating unit(s) represented by the general formulae (1) to (4) is, for example, preferably about 500 to about 1000000, more preferably about 1000 to about 20000.

Examples of a chemical conversion treatment method for imparting corrosion resistance to the barrier layer 3 include a method for coating the barrier layer 3 with a dispersion of fine particles of a metal oxide such as aluminum oxide, titanium oxide, cerium oxide, or tin oxide, or barium sulfate in phosphoric acid, and baking the barrier layer 3 at 150° C. or higher to form the acid resistance film on a surface of the barrier layer 3. A resin layer obtained by crosslinking a cationic polymer with a crosslinking agent may be further formed on the acid resistance film. Here, examples of the cationic polymer include polyethyleneimine, an ion polymer complex formed of a polymer having polyethyleneimine and a carboxylic acid, a primary amine-grafted acrylic resin obtained by graft-polymerizing a primary amine with an acrylic main backbone, polyallylamine or derivatives thereof, and an aminophenol. These cationic polymers may be used alone or in combination of two or more thereof. Examples of the crosslinking agent include a compound having at least one functional group selected from the group consisting of an isocyanate group, a glycidyl group, a carboxyl group, and an oxazoline group, and a silane coupling agent. These crosslinking agents may be used alone or in combination of two or more thereof.

A method for specifically providing the acid resistance film is, for example, a method for first degreasing at least an inner-layer side surface of an aluminum alloy foil by a known treatment method such as an alkali immersion method, an electrolytic cleaning method, an acid cleaning method, an electrolytic acid cleaning method, or an acid activation method, and then coating the degreased surface with a treatment solution (aqueous solution) containing, as a main component, metal phosphate salts such as chromium phosphate salt, titanium phosphate salt, zirconium phosphate salt, and zinc phosphate salt and a mixed product of these metal salts, with a treatment solution (aqueous solution) containing, as a main component, nonmetal phosphate salts and a mixed product of these nonmetal salts, or with a treatment solution (aqueous solution) containing a mixture of these metal phosphate salts and/or nonmetal phosphate salts with an aqueous synthetic resin such as an acrylic resin, a phenolic resin, or a urethane resin, by a known coating method such as roll coating, gravure printing, or an immersion method. Thus, it is possible to form the acid resistance film. For example, a treatment with a chromium phosphate salt-based treatment solution forms an acid resistance film made of chromium phosphate, aluminum phosphate, aluminum oxide, aluminum hydroxide, aluminum fluoride, or the like, and a treatment with a zinc phosphate salt-based treatment solution forms an acid resistance film made of zinc phosphate hydrate, aluminum phosphate, aluminum oxide, aluminum hydroxide, aluminum fluoride, or the like.

Another example of the specific method for providing the acid resistance film is, for example, a method for first degreasing at least an inner-layer side surface of an aluminum alloy foil by a known treatment method such as an alkali immersion method, an electrolytic cleaning method, an acid cleaning method, an electrolytic acid cleaning method, or an acid activation method, and then subjecting the degreased surface to a known anodization treatment. Thus, it is possible to form the acid resistance film.

Other examples of the acid resistance film include a phosphate salt-based film and a chromic acid-based film. Examples of the phosphate salt-based film include a zinc phosphate film, an iron phosphate film, a manganese phosphate film, a calcium phosphate film, and a chromium phosphate film. Examples of the chromic acid-based film include a chromium chromate film.

As another example of the acid resistance film, the acid resistance film is formed of, for example, a phosphate salt, a chromate salt, fluoride, or a triazine thiol compound to exhibit an effect of preventing delamination between aluminum and a layer functioning as the base material layer during emboss molding, preventing dissolution and corrosion of a surface of aluminum, particularly dissolution and corrosion of aluminum oxide existing on a surface of aluminum that are caused by hydrogen fluoride generated through a reaction of an electrolyte with moisture, improving the adhesiveness (wettability) on a surface of aluminum, preventing delamination between a layer functioning as the base material and aluminum during heat sealing, and preventing, for embossed aluminum, delamination between a layer functioning as the base material layer and aluminum during press molding. Among the substances for forming the acid resistance film, good for application to a surface of aluminum and bake drying is an aqueous solution formed of three components, i.e., a phenolic resin, a chromium (III) fluoride compound, and phosphoric acid.

The acid resistance film includes a layer containing cerium oxide, phosphoric acid or a phosphate salt, an anionic polymer, and a crosslinking agent for crosslinking the anionic polymer, and the phosphoric acid or the phosphate salt may be blended in an amount of about 1 to 100 parts by mass relative to 100 parts by mass of the cerium oxide. The acid resistance film preferably has a multilayer structure further including a layer that contains a cationic polymer and a crosslinking agent for crosslinking the cationic polymer.

The anionic polymer is preferably a copolymer containing, as a main component, poly(meth)acrylic acid or a salt thereof, or (meth)acrylic acid or a salt thereof. The crosslinking agent is preferably at least one selected from the group consisting of a compound having any one functional group of an isocyanate group, a glycidyl group, a carboxyl group, and an oxazoline group, and a silane coupling agent.

The phosphoric acid or the phosphate salt is preferably condensed phosphoric acid or a condensed phosphate salt.

As for the chemical conversion treatment, only one chemical conversion treatment may be performed, or two or more chemical conversion treatments may be performed in combination. These chemical conversion treatments may be performed using one compound alone or two or more compounds in combination. Among the chemical conversion treatments, preferred are, for example, a chromate treatment and a chemical conversion treatment using a chromium compound, a phosphoric acid compound, and an aminated phenolic polymer in combination. Particularly, the chromium compound is preferably a chromic acid compound.

Specific examples of the acid resistance film include a film containing at least one of a phosphate salt, a chromate salt, fluoride, or triazine thiol. An acid resistance film containing a cerium compound is also preferred. The cerium compound is preferably cerium oxide.

Specific examples of the acid resistance film also include a phosphate salt-based film, a chromate salt-based film, a fluoride-based film, and a triazine thiol compound film. The acid resistance film may be one of these films or a combination of a plurality of films. Further, the acid resistance film may be a film formed with a treatment solution containing a mixture of a metal phosphate salt with an aqueous synthetic resin or a treatment solution containing a mixture of a nonmetal phosphate salt with an aqueous synthetic resin, after degreasing a surface of an aluminum alloy foil to be subjected to a chemical conversion treatment.

The composition of the acid resistance film can be analyzed according to, for example, time-of-flight secondary ion mass spectrometry. The analysis of the composition of the acid resistance film according to time-of-flight secondary ion mass spectrometry allows detection of, for example, a peak(s) derived from at least one of $Ce^+$ or $Cr^+$.

A surface of the aluminum alloy foil preferably includes the acid resistance film containing at least one element selected from the group consisting of phosphorus, chromium, and cerium. It is possible to confirm by X-ray photoemission spectroscopy that the acid resistance film on the surface of the aluminum alloy foil in the battery packaging material contains at least one element selected from the group consisting of phosphorus, chromium, and cerium. Specifically, first, the heat-sealable resin layer, the adhesive agent layer, and the like are physically delaminated that have been laminated on the aluminum alloy foil in the battery packaging material. Next, the aluminum alloy foil is put in an electric furnace and an organic component existing on the surface of the aluminum alloy foil is removed at about 300° C. for about 30 minutes. Subsequently, the surface of the aluminum alloy foil is confirmed by X-ray photoemission spectroscopy that the surface contains the element(s).

The amount of the acid resistance film to be formed on the surface of the barrier layer 3 in the chemical conversion treatment is not particularly limited, but, for example, when the above-mentioned chromate treatment is performed, it is desirable that the chromic compound be contained in an amount of about 0.5 to 50 mg, preferably about 1.0 to 40 mg in terms of chromium, the phosphorus compound be contained in an amount of about 0.5 to 50 mg, preferably about 1.0 to 40 mg in terms of phosphorus, and the aminated phenolic polymer be contained in an amount of about 1.0 to 200 mg, preferably about 5.0 to 150 mg, per 1 m² of the surface of the barrier layer 3.

The thickness of the acid resistance film is not particularly limited but is, for example, preferably about 1 nm to about 10 μm, more preferably about 1 to 100 nm, further preferably about 1 to 50 nm, from a viewpoint of cohesion force of the film and adhesion force between the acid resistance film and the barrier layer 3 or the heat-sealable resin layer. The thickness of the acid resistance film can be measured by observation with a transmission electron microscope or by a combination of observation with a transmission electron microscope and energy dispersive X-ray spectroscopy or electron energy-loss spectroscopy.

The chemical conversion treatment is performed by applying a solution containing a compound used for forming the acid resistance film to a surface of the barrier layer through, for example, bar coating, roll coating, gravure coating, or an immersion method, and then heating the barrier layer such that the temperature of the barrier layer becomes about 70 to 200° C. The barrier layer may be degreased by an alkali immersion method, an electrolytic cleaning method, an acid cleaning method, an electrolytic acid cleaning method or the like before subjected to a chemical conversion treatment. When degreasing is performed as described above, the chemical conversion treatment on the surface of the barrier layer can be more efficiently performed.

[Heat-Sealable Resin Layer 4]

In the battery packaging material according to the present invention, the heat-sealable resin layer 4 corresponds to an innermost layer and is a layer whose portions are heat-sealed to each other during assembly of a battery to hermetically seal a battery element in the heat-sealable resin layer.

A resin component used for the heat-sealable resin layer 4 is not particularly limited as long as it is heat-sealable, and examples of the resin component include a polyolefin, a cyclic polyolefin, a carboxylic acid-modified polyolefin, and a carboxylic acid-modified cyclic polyolefin. That is, the resin that forms the heat-sealable resin layer 4 may optionally have a polyolefin backbone but preferably has a polyolefin backbone. The polyolefin backbone contained in the resin that forms the heat-sealable resin layer 4 can be confirmed by analysis such as infrared spectroscopy or gas chromatography-mass spectrometry, and the analysis method is not particularly restricted. For example, measurement of a maleic anhydride-modified polyolefin by infrared spectroscopy detects peaks derived from maleic anhydride at wave numbers of around 1760 $cm^{-1}$ and around 1780 $cm^{-1}$. When the degree of acid modification is low, however, a peak becomes small to be sometimes undetected. In that case, analysis can be performed by nuclear magnetic resonance spectroscopy.

Specific examples of the polyolefin include polyethylene such as low-density polyethylene, medium-density polyethylene, high-density polyethylene, and linear low-density polyethylene; polypropylene such as homopolypropylene, polypropylene as a block copolymer (e.g., a block copolymer of propylene and ethylene), and polypropylene as a random copolymer (e.g., a random copolymer of propylene and ethylene); and a terpolymer of ethylene-butene-propylene. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, butadiene, and isoprene. Examples of the cyclic monomer as a constituent monomer of the cyclic polyolefin include cyclic alkenes such as norbornene; specific examples include cyclic dienes such as cyclopentadiene, dicyclopentadiene, cyclohexadiene, and norbornadiene. Among these polyolefins, cyclic alkenes are preferred, and norbornene is further preferred, for example. It is also possible to use styrene as a constituent monomer.

The carboxylic acid-modified polyolefin is a polymer obtained by modifying the polyolefin with a carboxylic acid through block polymerization or graft polymerization. Examples of the carboxylic acid used for the modification include maleic acid, acrylic acid, itaconic acid, crotonic acid, maleic anhydride, and itaconic anhydride.

The carboxylic acid-modified cyclic polyolefin is a polymer obtained by copolymerizing a part of a monomer that constitutes the cyclic polyolefin with the α,β-unsaturated carboxylic acid or the anhydride thereof, or by block-polymerizing or graft-polymerizing the cyclic polyolefin with an α,β-unsaturated carboxylic acid or an anhydride thereof. The cyclic polyolefin to be modified with a carboxylic acid is the same as described above. The carboxylic acid used for the modification is the same as used for the modification of the acid-modified polyolefin.

Among these resin components, a carboxylic acid-modified polyolefin is preferred; and carboxylic acid-modified polypropylene is further preferred, for example.

The heat-sealable resin layer 4 may be formed of one resin component alone or a blended polymer obtained by combining two or more resin components. Further, the heat-sealable resin layer 4 may be formed of only one layer or two or more layers with the identical resin component or different resin components.

A lubricant may be contained in the heat-sealable resin layer 4. The lubricant existing on a surface of the heat-sealable resin layer 4 may be one oozed out from a lubricant contained in a resin that forms the heat-sealable resin layer 4, or one applied on a surface of the heat-sealable resin layer 4. The heat-sealable resin layer 4 containing a lubricant is capable of increasing the moldability of the battery packaging material. The lubricant is not particularly limited and a known lubricant may be used. Examples of the lubricant include those exemplified above for the polyester film 1. These lubricants may be used alone or in combination of two or more thereof. The abundance of the lubricant on the surface of the heat-sealable resin layer 4 is not particularly limited but is, for example, preferably about 10 to 50 mg/m$^2$, further preferably about 15 to 40 mg/m$^2$ in an environment at a temperature of 24° C. and a relative humidity of 60%, from a viewpoint of increasing the moldability of the electron packaging material.

As described above, in recent years, the battery packaging material is being required to be furthermore reduced in film thickness, along with a requirement of reducing the size and the thickness of batteries. Therefore, the thickness of the heat-sealable resin layer situated as an innermost layer of the battery packaging material is also required to be decreased to the minimum possible thickness. However, when the ratio of the thickness of the heat-sealable resin layer to the thickness of the base material decreases, a peripheral edge of a concave portion formed on the battery packaging material is curled (curved), so that storage of a battery element and heat sealing of the heat-sealable resin layer may be hindered, leading to deterioration of production efficiency of batteries. Particularly, a battery packaging material to be used in a large secondary battery such as a secondary battery for use in cars has a problem that since the battery packaging material has a large size, the impact of curling on productivity of batteries is very large.

When the ratio of the thickness of the heat-sealable resin layer 4 to the thickness of the polyester film 1 decreases (for example, the ratio of the thickness of the heat-sealable resin layer 4 to the thickness of the polyester film 1 (thickness of heat-sealable resin layer/thickness of polyester film) is 4 or less, with the thickness of the polyester film 1 defined as 1), the battery packaging material is likely to increase the size of curling after molding. The battery packaging material according to the present invention, however, has a degree of surface orientation ($Y_{md}/Y_{min}$) in the range of 1.4 to 2.7, so that the battery packaging material has excellent moldability and effectively minimizes curling after molding. In the battery packaging material according to the present invention, the ratio of the thickness of the heat-sealable resin layer 4 to the thickness of the polyester film 1 (thickness of heat-sealable resin layer/thickness of polyester film) is 4 or less as a preferable upper limit, less than 3 as more preferable upper limit, 2 or less as further preferable upper limit and is, for example, 1 or more as a preferable lower limit, from a viewpoint of suitably minimizing curling after molding. The ratio is preferably in a range of 1 or more and 4 or less, more preferably in a range of 1 or more and less than 3, further preferably in a range of 1 or more and 2 or less.

The thickness of the heat-sealable resin layer 4 is, for example, preferably about 100 μm or less, more preferably about 40 μm or less as an upper limit and is, for example, about 15 μm or more as a lower limit, from a viewpoint of reducing the thickness of the battery packaging material to the minimum possible and minimizing curling after molding. The thickness of the heat-sealable resin layer 4 is preferably in a preferable range of about 15 to 100 μm, more preferably in a range of about 15 to 40 μm.

[Adhesive Layer 5]

In the battery packaging material according to the present invention, the adhesive layer 5 is a layer provided between the barrier layer 3 and the heat-sealable resin layer 4 as necessary, for strongly bonding these layers to each other.

The adhesive layer 5 is formed of a resin capable of bonding the barrier layer 3 to the heat-sealable resin layer 4. As the resin used for forming the adhesive layer 5, it is possible to use, for example, the same adhesive agents as exemplified for the adhesive agent layer 2 in terms of the bonding mechanism of the resin, the type of an adhesive agent component, and the like. As the resin used for forming the adhesive layer 5, it is also possible to use polyolefin-based resins exemplified above for the heat-sealable resin layer 4, such as a polyolefin, a cyclic polyolefin, a carboxylic acid-modified polyolefin, and a carboxylic acid-modified cyclic polyolefin. That is, the resin that forms the adhesive layer 5 may optionally have a polyolefin backbone but preferably has a polyolefin backbone. The polyolefin backbone contained in the resin that forms the adhesive layer 5 can be confirmed by analysis such as infrared spectroscopy or gas chromatography-mass spectrometry, and the analysis method is not particularly restricted. For example, measurement of a maleic anhydride-modified polyolefin by infrared spectroscopy detects peaks derived from maleic anhydride at wave numbers of around 1760 cm$^{-1}$ and around 1780 cm$^{-1}$. When the degree of acid modification is low, however, a peak becomes small to be sometimes undetected. In that case, analysis can be performed by nuclear magnetic resonance spectroscopy. The polyolefin is preferably a carboxylic acid-modified polyolefin, particularly preferably a carboxylic acid-modified polypropylene, because they are excellent in adhesion between the barrier layer 3 and the heat-sealable resin layer 4.

Further, the adhesive layer 5 may be a cured product of a resin composition containing an acid-modified polyolefin and a curing agent, from a viewpoint of reducing the thickness of the battery packaging material and providing the battery packaging material excellent in shape stability after molding. As the acid-modified polyolefin, there can be exemplified the same carboxylic acid-modified polyolefin and carboxylic acid-modified cyclic polyolefin as exemplified for the heat-sealable resin layer 4. The adhesive layer 5 is preferably a cured product of a resin composition containing at least one selected from the group consisting of an isocyanate group-containing compound, an oxazoline group-containing compound, and an epoxy group-containing compound. The adhesive layer 5 is particularly preferably a cured product of a resin composition containing at least one selected from the group consisting of an isocyanate group-containing compound and an epoxy group-containing compound. The adhesive layer 5 preferably contains at least one selected from the group consisting of a urethane resin, an amide ester resin, and an epoxy resin. The adhesive layer 5 more preferably contains a urethane resin and an epoxy resin. The adhesive layer 5 is more preferably a cured product of a resin composition containing at least one of these compounds and resins, and the above-mentioned acid-modified polyolefin. When in the adhesive layer 5 is left an unreacted product of a curing agent such as an isocyanate group-containing compound, an oxazoline group-containing compound, or an epoxy resin, it is possible to confirm the existence of the unreacted product by a method selected from, for example, infrared spectroscopy, Raman spectroscopy, and time-of-flight secondary ion mass spectrometry (TOF-SIMS).

The curing agent is not particularly limited as long as it cures the acid-modified polyolefin. Examples of the curing agent include an epoxy-based curing agent, a polyfunctional isocyanate-based curing agent, a carbodiimide-based curing agent, and an oxazoline-based curing agent. The adhesive layer 5 is preferably a cured product of a resin composition containing a curing agent having at least one selected from the group consisting of an oxygen atom, a heterocyclic ring, a C=N bond, and a C—O—C bond, from a viewpoint of further increasing the adhesion between the acid resistance film and the adhesive layer 5. Examples of the curing agent having a heterocyclic ring include an oxazoline group-containing curing agent and an epoxy group-containing curing agent. Examples of the curing agent having a C=N bond include an oxazoline group-containing curing agent and an isocyanate group-containing curing agent. Examples of the curing agent having a C—O—C bond include an oxazoline group-containing curing agent, an epoxy group-containing curing agent, and a urethane resin. The fact that the adhesive layer 5 is a cured product of a resin composition containing these curing agents can be confirmed by a method such as gas chromatography-mass spectrometry (GCMS), infrared spectroscopy (IR), time-of-flight secondary ion mass spectrometry (TOF-SIMS), or X-ray photoemission spectroscopy (XPS).

The epoxy-based curing agent is not particularly limited as long as it is a compound having at least one epoxy group. Examples of the epoxy-based curing agent include epoxy resins such as bisphenol A diglycidyl ether, modified bisphenol A diglycidyl ether, novolak glycidyl ether, glycerin polyglycidyl ether, and polyglycerin polyglycidyl ether.

The polyfunctional isocyanate-based curing agent is not particularly limited as long as it is a compound having two or more isocyanate groups. Specific examples of the polyfunctional isocyanate-based curing agent include isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymerized products thereof with another polymer.

The carbodiimide-based curing agent is not particularly limited as long as it is a compound having at least one carbodiimide group (—N=C=N—). The carbodiimide-based curing agent is preferably a polycarbodiimide compound having at least two carbodiimide groups.

The oxazoline-based curing agent is not particularly limited as long as it is a compound having an oxazoline backbone. Specific examples of the oxazoline-based curing agent include EPOCROS Series manufactured by NIPPON SHOKUBAI CO., LTD.

The curing agent may be formed of two or more compounds from a viewpoint of increasing the adhesion between the barrier layer 3 and the heat-sealable resin layer 4 by the adhesive layer 5.

The content of the curing agent in the resin composition for forming the adhesive layer 5 is preferably in a range of 0.1 to 50% by mass, more preferably in a range of 0.1 to 30% by mass, further preferably in a range of 0.1 to 10% by mass.

The thickness of the adhesive layer 5 is not particularly limited as long as it exhibits a function as an adhesive layer. When an adhesive agent exemplified for the adhesive agent layer 2 is used, however, the thickness of the adhesive layer 5 is, for example, preferably about 2 to 10 μm, more preferably about 2 to 5 μm. When a resin exemplified for the heat-sealable resin layer 4 is used, the thickness of the adhesive layer 5 is, for example, preferably about 2 to 50 μm, more preferably about 10 to 40 μm. When the adhesive layer 5 is a cured product of an acid-modified polyolefin and a curing agent, the thickness of the adhesive layer 5 is, for example, preferably about 30 μm or less, more preferably about 0.1 to 20 μm, further preferably about 0.5 to 5 μm. When the adhesive layer 5 is a cured product of a resin composition containing an acid-modified polyolefin and a curing agent, it is possible to form the adhesive layer 5 by application of the resin composition followed by, for example, heating for curing.

[Surface Coating Layer 6]

In the battery packaging material according to the present invention, the surface coating layer 6 may be provided on the polyester film 1 (a polyester film 1's surface opposite to the barrier layer 3) as necessary, for the purpose of, for example, improving designability, electrolytic solution resistance, scratch resistance, and moldability. The surface coating layer 6 is a layer situated as an outermost layer when a battery is assembled.

The surface coating layer 6 can be formed of, for example, polyvinylidene chloride, a polyester resin, a urethane resin, an acrylic resin, or an epoxy resin. Among these resins, the surface coating layer 6 is preferably formed of a two-liquid curable resin. Examples of the two-liquid curable resin for forming the surface coating layer 6 include a two-liquid curable urethane resin, a two-liquid curable polyester resin, and a two-liquid curable epoxy resin. The surface coating layer 6 may also contain an additive.

Examples of the additive include fine particles having a particle size of 0.5 nm to 5 μm. A material for the additive is not particularly limited, and examples of the material include a metal, a metal oxide, an inorganic substance, and an organic substance. A shape of the additive is not also particularly limited, and examples of the shape include a spherical shape, a fibrous shape, a plate shape, an amorphous shape, and a balloon shape. Specific examples of the additive include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylon, crosslinked acrylic, crosslinked styrene, crosslinked polyethylene, benzoguanamine, gold, aluminum, copper, and nickel. These additives may be used alone or in combination of two or more thereof. Among these additives, preferred are, for example, silica, barium sulfate, and titanium oxide from a viewpoint of, for example, dispersion stability, and costs. The additive may have the surface thereof subjected to various surface treatments such as an insulation treatment and a dispersibility enhancing treatment.

The content of the additive in the surface coating layer 6 is not particularly limited but is, for example, preferably about 0.05 to 1.0% by mass, more preferably about 0.1 to 0.5% by mass.

A method for forming the surface coating layer 6 is not particularly limited, and examples of the method include a method for applying a two-liquid curable resin for forming the surface coating layer 6 onto one surface of the polyester film 1. When the additive is blended, application may be performed after the additive is added to and mixed with the two-liquid curable resin.

The thickness of the surface coating layer 6 is not particularly limited as long as it exhibits the above-mentioned functions as the surface coating layer 6. The thickness of the surface coating layer 6 is, for example, 0.5 to 10 μm, preferably 1 to 5 μm.

3. Method for Producing Battery Packaging Material

A method for producing a battery packaging material according to the present invention is not particularly limited as long as it is capable of giving a laminate including layers that each have predetermined composition and are laminated on top of another. The method for producing a battery packaging material is, for example, a method including: a step of obtaining a laminate by laminating at least a polyester film, a barrier layer, and a heat-sealable resin layer in this order; and using, as the polyester film, a polyester film having a ratio in a range of 1.4 to 2.7 between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ and an absorption peak intensity $Y_{1410}$ at 1410 cm$^{-1}$ ($Y_{1340}/Y_{1410}$) in infrared absorption spectra acquired for 18 directions at intervals of 10° from 00 to 1800 on a surface of the polyester film according to attenuated total reflection of Fourier transform infrared spectroscopy.

One example of the method for producing a battery packaging material according to the present invention is as follows. First, a laminate is formed that includes a polyester film 1, an adhesive agent layer 2, and a barrier layer 3 laminated in this order (hereinafter, the laminate may be described as a "laminate A"). Specifically, the laminate A can be formed according to a dry lamination method for applying, by a coating method such as gravure coating or roll coating, an adhesive agent used for forming the adhesive agent layer 2 onto the polyester film 1 or the barrier layer 3 having a surface thereof subjected to a chemical conversion treatment as necessary, drying the adhesive agent, then laminating the barrier layer 3 or the polyester film 1 on top of the other, and curing the adhesive agent layer 2.

Next, an adhesive layer 5 and a heat-sealable resin layer 4 are laminated in this order on the barrier layer 3 of the laminate A. There can be exemplified (1) a method for laminating, through coextrusion, the adhesive layer 5 and the heat-sealable resin layer 4 on the barrier layer 3 of the laminate A (coextrusion lamination method); (2) a method for separately forming a laminate including the adhesive layer 5 and the heat-sealable resin layer 4 laminated on top of another and laminating this laminate on the barrier layer 3 of the laminate A by a thermal lamination method; (3) a method for applying an adhesive agent for formation of the adhesive layer 5 onto the barrier layer 3 of the laminate A by an extrusion method or solution coating and subjecting the adhesive agent to, for example, drying at high temperature and further baking to laminate the adhesive layer 5 on the barrier layer 3, and laminating the heat-sealable resin layer 4, which has been formed in a sheet shape beforehand, on this adhesive layer 5 by a thermal lamination method; and (4) a method for pouring the adhesive layer 5, which has been melted, into between the barrier layer 3 of the laminate A and the heat-sealable resin layer 4 that has been formed in a sheet shape beforehand and simultaneously sticking the laminate A to the heat-sealable resin layer 4 with the adhesive layer 5 interposed therebetween (sandwich lamination method).

When a surface coating layer 6 is provided, the surface coating layer 6 is laminated on a polyester film 1's surface opposite to the barrier layer 3. The surface coating layer 6 can be formed by, for example, applying the above-mentioned resin for forming the surface coating layer 6 to the surface of the polyester film 1. The order is not particularly limited for a step of laminating the barrier layer 3 on a surface of the polyester film 1 and a step of laminating the surface coating layer 6 on a surface of the polyester film 1. For example, after the surface coating layer 6 is formed on a surface of the polyester film 1, the barrier layer 3 may be formed on the polyester film 1's surface opposite to the surface coating layer 6.

As described above, a laminate is formed that includes the surface coating layer 6 provided as necessary, the polyester film 1, the adhesive agent layer 2 provided as necessary, the barrier layer 3 having the surface thereof subjected to a chemical conversion treatment as necessary, the adhesive layer 5, and the heat-sealable resin layer 4. The laminate may be further subjected to a hot roll contact-type, hot air-type, or near- or far-infrared-type heating treatment, in order to strengthen the adhesiveness of the adhesive agent layer 2 or the adhesive layer 5. As the conditions for such a heating treatment, there can be exemplified heating at about 150 to 250° C. for about 1 to 5 minutes.

In the battery packaging material according to the present invention, the layers that form the laminate may be subjected to a surface activation treatment such as a corona treatment, a blast treatment, an oxidation treatment, or an ozone treatment as necessary, in order to improve or stabilize, for example, film formability, lamination processing, and final product secondary processing (pouching and embossing molding) suitability.

4. Use of Battery Packaging Material

The battery packaging material according to the present invention is used as packaging for hermetically sealing and storing a battery element such as a positive electrode, a negative electrode, and an electrolyte therein. That is, a battery element including at least a positive electrode, a negative electrode, and an electrolyte can be stored in packaging formed of the battery packaging material according to the present invention to form a battery.

Specifically, a battery element including at least a positive electrode, a negative electrode, and an electrolyte is covered with the battery packaging material according to the present invention such that a flange part (region where portions of a heat-sealable resin layer are in contact with each other) can be formed on a periphery of the battery element, while metal terminals connected to the positive electrode and the negative electrode respectively are allowed to extrude exteriorly, and the portions of the heat-sealable resin layer at the flange part are hermetically heat-sealed to each other, thereby providing a battery produced by using the battery packaging material. When a battery element is stored in packaging formed of the battery packaging material according to the present invention, the packaging is formed such that a heat-sealable resin portion of the battery packaging material according to the present invention comes inside (surface in contact with the battery element).

The battery packaging material according to the present invention may be used for either a primary battery or a secondary battery but is preferably used for a secondary battery. The type of the secondary battery to which the battery packaging material according to the present invention is applied is not particularly limited, and examples of the secondary battery include a lithium ion battery, a lithium ion polymer battery, a lead storage battery, a nickel-hydrogen storage battery, a nickel-cadmium storage battery, a nickel-iron storage battery, a nickel-zinc storage battery, a silver oxide-zinc storage battery, a metal-air battery, a polyvalent cation battery, a condenser, and a capacitor. Among these secondary batteries, for example, a lithium ion battery and a lithium ion polymer battery are suitable subjects for application of the battery packaging material according to the present invention.

5. Polyester Film

A polyester film according to the present invention is a polyester film used for use in a battery packaging material. The polyester film according to the present invention is characterized by having a ratio in a range of 1.4 or more and 2.7 or less between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ and an absorption peak intensity $Y_{1410}$ at 1410 cm$^{-1}$ ($Y_{1340}/Y_{1410}$) in infrared absorption spectra acquired for 18 directions at intervals of 10° from 0° to 180° on a surface of the polyester film according to attenuated total reflection of Fourier transform infrared spectroscopy. The specific structure of the polyester film according to the present invention is the same structure as described in Section "2. Layers Forming Battery Packaging Material [Polyester film 1]."

EXAMPLES

The present invention is described in detail below by way of examples and comparative examples. It is to be noted that the present invention is not limited to the examples.

Examples 1 to 7 and Comparative Examples 1 to 3

<Production of Battery Packaging Material>

In each of the examples and the comparative examples, a barrier layer formed of an aluminum foil (JIS H4160: 1994 A8021H-O) was laminated on a stretched polyethylene terephthalate film by a dry lamination method, the aluminum foil having both surfaces thereof subjected to a chemical conversion treatment to form acid resistance films. Specifically, a two-liquid curable urethane adhesive agent (a polyol compound and an aromatic isocyanate-based compound) was applied to one surface of the aluminum foil to form an adhesive agent layer (thickness: 3 μm) on the barrier layer. Next, the adhesive agent layer on the barrier layer and the polyethylene terephthalate film were laminated on top of another and subjected to an aging treatment to prepare a laminate including the stretched polyethylene terephthalate film, the adhesive agent layer, and the barrier layer. The chemical conversion treatment for the aluminum foil used as the barrier layer was performed by applying to both surfaces of the aluminum foil a treatment solution containing a phenolic resin, a chromium fluoride compound, and phosphoric acid through roll coating such that the application amount of chromium was 10 mg/m$^2$ (dry mass), and baking the aluminum foil.

Next, maleic anhydride-modified polypropylene as an adhesive layer and random polypropylene as a heat-sealable resin layer were coextruded on the barrier layer of the resultant laminate to laminate the adhesive layer and the heat-sealable resin layer on the barrier layer. Next, the resultant laminate was subjected to aging and heating to give a battery packaging material including the stretched polyethylene terephthalate film, the adhesive agent layer, the barrier layer, the adhesive layer, and the heat-sealable resin layer laminated in this order. The layer structure and the thickness of the layers of the battery packaging material are as shown in Table 1.

TABLE 1

| | Layer structure |
|---|---|
| Example 1 | PET(25)/DL(3)/ALM(35)/PPa(30)/PP(30) |
| Example 2 | PET(25)/DL(3)/ALM(35)/PPa(30)/PP(30) |
| Example 3 | PET(25)/DL(3)/ALM(35)/PPa(30)/PP(30) |
| Example 4 | PET(25)/DL(3)/ALM(35)/PPa(30)/PP(30) |
| Comparative Example 1 | PET(25)/DL(3)/ALM(35)/PPa(30)/PP(30) |
| Comparative Example 2 | PET(25)/DL(3)/ALM(35)/PPa(30)/PP(30) |
| Example 5 | PET(12)/DL(3)/ALM(30)/PPa(14)/PP(10) |
| Example 6 | PET(12)/DL(3)/ALM(30)/PPa(14)/PP(10) |
| Example 7 | PET(12)/DL(3)/ALM(30)/PPa(14)/PP(10) |
| Comparative Example 3 | PET(12)/DL(3)/ALM(30)/PPa(14)/PP(10) |

In Table 1, a numerical value in parentheses of the layer structure indicates the thickness (μm).

<Measurement of Degree of Surface Orientation>

For each of a surface of the stretched polyester film laminated in the battery packaging material and a surface of the stretched polyester film as a single layer used for lamination, a ratio was calculated between a maximum value $Y_{max}$ and a minimum value $Y_{min}$ (degree of surface orientation: $Y_{max}/Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ (CH$_2$ wagging vibration) and an absorption peak intensity $Y_{1410}$ at 1410 cm$^{-1}$ (C=C stretching vibration) ($Y_{1340}/Y_{1410}$) in infrared absorption spectra acquired for 18 directions at intervals of 10° from 0° to 180° on the surface of each of the stretched polyester films according to attenuated total reflection (ATR) of Fourier transform infrared spectroscopy (FT-IR). Specific conditions for measuring the infrared absorption spectra are as follows. Table 2 shows the results.

(Conditions for Measuring Infrared Absorption Spectra)
Spectrometer: Nicolet iS10 FT-IR manufactured by Thermo Fisher Scientific Inc.
Attachment: attachment (Seagull) for single reflection ATR
Detector: MCT (Hg Cd Te)
Wavenumber resolution: 8 cm-1
IRE: Ge
Angle of incidence: 30°
Polarizer: wire grid, S polarization
Baseline: average value of intensity in a wavenumber range of 1800 cm-1 to 2000 cm-1
Absorption peak intensity $Y_{1340}$: value obtained by deducting value of baseline from maximum value of peak intensity in wavenumber range of 1335 cm-1 to 1342 cm-1
Absorption peak intensity $Y_{1410}$: value obtained by deducting value of baseline from maximum value of peak intensity in wavenumber range of 1400 cm-1 to 1410 cm-1

<Measurement of Birefringence Index>

A birefringence index of the polyethylene terephthalate film was measured using a phase difference measuring apparatus (KOBRA-WR manufactured by Oji Scientific Instruments Co., Ltd.). The measurement wavelength was set to 550 nm and the angle of incidence was set to 10 degrees. The thickness of the polyethylene terephthalate film used for calculating the birefringence index is a value measured using a micrometer (Digimatic Micrometer manufactured by Mitutoyo Corporation). An average refractive index of the polyester film used for calculation of the birefringence index was set to an assumed value of 1.6200. Table 2 shows the results.

<Evaluation of Moldability>

Each of the battery packaging materials obtained above was cut into a rectangle with length (z direction) 150 mm and width (x direction) 100 mm to form a test sample. This sample was cold-molded (draw-in one-step molding) using a rectangular mold (female mold, surface: a maximum height roughness (nominal value of Rz) of 3.2 μm that is specified in Table 2 of JIS B 0659-1: 2002, Annex 1 (reference), Standard Surface Roughness Piece for Comparison) having an opening size of 30 mm (x direction)×50 mm (z direction) and a corresponding mold (male mold, surface: a maximum height roughness (nominal value of Rz) of 1.6 μm that is specified in Table 2 of JIS B 0659-1: 2002, Annex 1 (reference), Standard Surface Roughness Piece for Comparison). The cold molding was performed while the molding depth was changed in 0.5-mm lengths from a molding depth of 0.5 mm at a pressing force (surface pressure) of 0.9 MPa, and 10 samples were subjected to the cold molding at each depth. At this time, the molding was performed, with the test sample placed on the female mold such that the heat-sealable resin layer was situated on a male mold side. The male and female molds had a clearance of 0.5 mm therebetween. As regards the samples cold-molded, a value calculated by the following equation was defined as limited molding depth of the battery packaging material, with A mm representing the deepest molding depth at which none of the 10 samples generated either pinholes or cracks on the aluminum foils, and B sample(s) representing the number of samples that generated pinholes or the like at the shallowest molding depth at which the aluminum foil generated pinholes or the like. Table 2 shows the results.

Limited molding depth=$A$ mm+(0.5 mm/10 samples)×(10 samples−$B$ samples)

<Evaluation of Curling after Molding>

Figure 5:
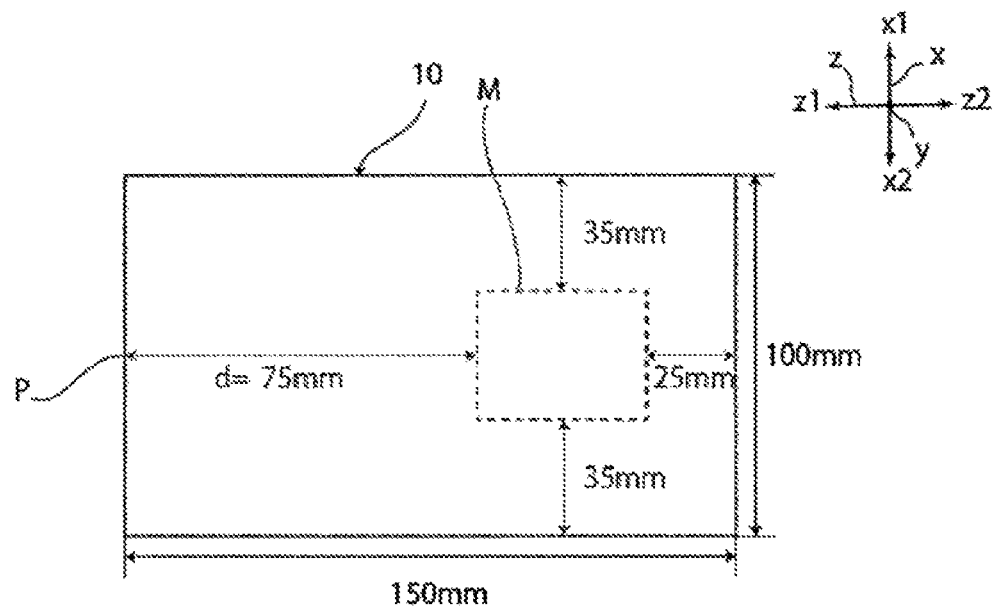
FIG. 5 is a schematic view for illustrating a method for evaluating curling.
Figure 6:
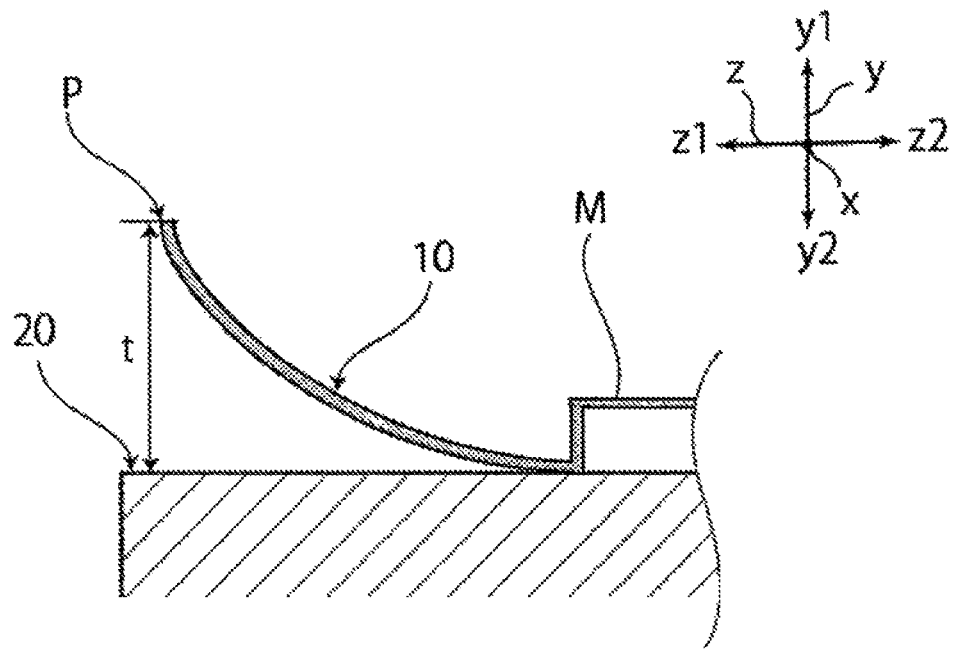
FIG. 6 is a schematic view for illustrating the method for evaluating curling.

Each of the battery packaging materials obtained above was cut to prepare a strip piece with length (z direction) 150 mm and width (x direction) 100 mm and the strip piece was used as a test sample. Next, the test sample was cold-molded (draw-in one-step molding) using the mold used for evaluating the moldability, with the test sample placed on the female mold such that the heat-sealable resin layer was situated on a male mold side, while the test sample was pressed at a pressing pressure (surface pressure) of 0.1 MPa to give a molding depth of 6 mm. FIG. 5 shows the details of a position at which molding was performed. As shown in FIG. 6, molding was performed at a position where a distance d was 75 mm between a rectangular molded part M and an end part P of a battery packaging material 10. Next, the battery packaging material 10 molded was placed on a horizontal surface 20 as shown in FIG. 6, and a maximum value t of the distance along a vertical line y between the horizontal surface 20 and the end part P was defined as the maximum height (molding curling (mm)) of a curled portion. Table 2 shows the results.

TABLE 2

| | Physical properties measured for PET film laminated in battery packaging material | | | Physical properties measured for PET film as single layer | | | | | | Moldability (mm) | Curling after molding (mm) |
|---|---|---|---|---|---|---|---|---|---|---|---|
| | Ymax | Ymin | Degree of surface orientation Ymax/Ymin | Ymax | Ymin | Degree of surface orientation Ymax/Ymin | nx | ny | Birefringence index nx − ny | | |
| Example 1 | 2.1 | 1.3 | 1.6 | 2.1 | 1.3 | 1.6 | 1.68833 | 1.66845 | 0.01988 | 6.2 | 25 |
| Example 2 | 2.2 | 1.2 | 1.8 | 2.2 | 1.2 | 1.8 | 1.69776 | 1.67597 | 0.02179 | 6.1 | 25 |
| Example 3 | 2.3 | 1.1 | 2.1 | 2.3 | 1.1 | 2.1 | 1.69548 | 1.67030 | 0.02518 | 6.2 | 23 |
| Example 4 | 2.4 | 1.0 | 2.4 | 2.4 | 1.0 | 2.4 | 1.69168 | 1.65021 | 0.04147 | 6.1 | 20 |
| Comparative Example 1 | 2.0 | 1.7 | 1.2 | 2.0 | 1.7 | 1.2 | 1.68404 | 1.66916 | 0.01488 | 6.0 | 50 |
| Comparative Example 2 | 2.8 | 1.0 | 2.8 | 2.8 | 1.0 | 2.8 | 1.69308 | 1.63677 | 0.05631 | 4.0 | 17 |
| Example 5 | 2.2 | 1.3 | 1.7 | 2.2 | 1.3 | 1.7 | 1.68737 | 1.66555 | 0.02182 | 4.5 | 24 |
| Example 6 | 2.3 | 1.2 | 1.9 | 2.3 | 1.2 | 1.9 | 1.69471 | 1.66926 | 0.02545 | 4.4 | 20 |
| Example 7 | 2.4 | 1.0 | 2.4 | 2.4 | 1.0 | 2.4 | 1.69142 | 1.64964 | 0.04178 | 4.2 | 17 |
| Comparative Example 3 | 2.0 | 1.6 | 1.3 | 2.0 | 1.6 | 1.3 | 1.67156 | 1.65621 | 0.01535 | 4.5 | 38 |

In Tables 1 and 2, PET represents the stretched polyethylene terephthalate, DL represents the adhesive agent layer, ALM represents the aluminum foil, PPa represents the adhesive layer formed of maleic anhydride-modified polypropylene, and PP represents the heat-sealable resin layer formed of random polypropylene.

DESCRIPTION OF REFERENCE SIGNS

1: Polyester Film
2: Adhesive agent layer
3: Barrier layer
4: Heat-sealable resin layer
5: Adhesive layer
6: Surface coating layer

The invention claimed is:

1. A battery comprising: a battery element that includes at least a positive electrode, a negative electrode, and an electrolyte; and packaging that is formed of a battery packaging material and stores the battery element therein, wherein the battery packaging material comprises a laminate that includes at least a barrier layer, a heat-sealable resin layer situated on one surface side of the barrier layer, and a polyester film situated on the other surface side of the barrier layer, the polyester film having a ratio in a range of 1.4 or more and 2.7 or less between a maximum value $Y_{max}$ and a minimum value $Y_{min}$ (degree of surface orientation: $Y_{max}Y_{min}$), with the maximum value $Y_{max}$ and the minimum value $Y_{min}$ respectively representing a maximum value and a minimum value of a ratio between an absorption peak intensity $Y_{1340}$ at 1340 cm$^{-1}$ and an absorption peak intensity $Y_{1410}$ at 1410 cm$^{-1}$ ($Y_{1340}/Y_{1410}$) in infrared absorption spectra acquired for 18 directions at intervals of 10° from 0° to 180° on a surface of the polyester film according to attenuated total reflection of Fourier transform infrared spectroscopy.

2. The battery according to claim 1, wherein a ratio of thickness of the heat-sealable resin layer to thickness of the polyester film is less than 3.

3. The battery according to claim 1, wherein the heat-sealable resin layer has a thickness of 100 μm or less.

4. The battery according to claim 1, wherein the polyester film has a birefringence index of 0.016 or more.

5. The battery according to claim 1, wherein the thickness of the polyester film is 12 to 50 μm.

6. The battery according to claim 1, wherein an adhesive layer is provided between the barrier layer and the heat-sealable resin layer, and the thickness of the adhesive layer is 0.1 to 20 μm.

7. The battery according to claim 1, wherein an adhesive layer is provided between the barrier layer and the heat-sealable resin layer, and the thickness of the adhesive layer is 10 to 50 μm.

8. The battery according to claim 1, wherein a base material of the laminate is a single layer of the polyester film.

\* \* \* \* \*